Aug. 7, 1928.
A. A. CLARKE
1,679,562
PORTABLE ELECTRIC JOINTER
Filed July 19, 1923
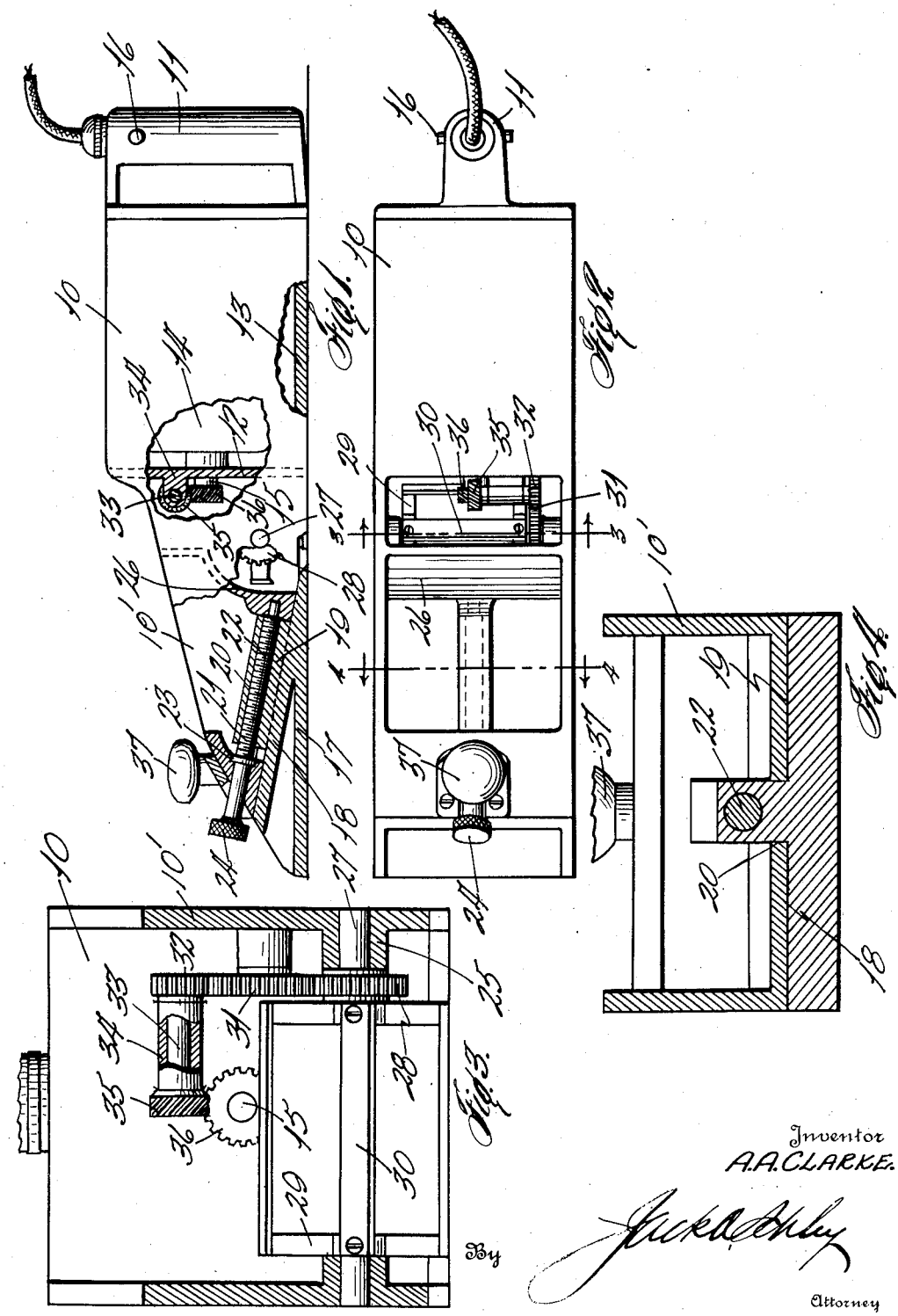
Inventor
A.A. CLARKE.
By
Attorney Patented Aug. 7, 1928.

1,679,562

UNITED STATES PATENT OFFICE.

ALEX A. CLARKE, OF CHICAGO, ILLINOIS.

PORTABLE ELECTRIC JOINTER.

Application filed July 19, 1923. Serial No. 652,527.

This invention relates to new and useful improvements in portable electric jointers.

The object of the invention is to provide a portable jointer having a self contained motor, whereby its cutter is driven.

Another object is to provide means for quickly adjusting the cutter with relation to the work, whereby the depth of the cut may be minutely controlled.

A construction designed to carry out the invention will be hereinafter described, together with other features of the invention.

The invention will be more readily understood from a reading of the following specification and by reference to the accompanying drawings, in which an example of the invention is shown, and wherein:

Fig. 1 is a view of a jointer constructed in accordance with my invention, a portion being in elevation and a portion in section, Fig. 2, is a plan view of the same, Fig. 3, is an enlarged cross-section on the line 3—3 of Fig. 2, and, Fig. 4, is an enlarged cross-section on the line 4—4 of Fig. 2.

In the drawings the numeral 10 designates an elongated housing having a bracket handle 11 at one end. Near its center the housing has a vertical transverse partition 12 from which a base 13 extends rearwardly to the end of the housing. A compartment is thus formed in which an electric motor 14 is suitably mounted with its armature shaft 15 extending through the partition. An electric switch 16 is mounted on the handle and suitably connected with the motor for controlling the same.

A shoe 17 supports the forward end of the housing and has a flat under surface which rides on the work. The shoe has an inclined top or upper face 18 contiguous to and sliding along the inclined under face 19 of the housing. The face 19 has a central longitudinal slot 20 receiving a lug 21 extending upward from the face 18 (see Figs. 1 and 4). The lug is longitudinally screw-threaded and receives an adjusting screw 22 having a bearing in the housing and held against longitudinal displacement by a collar 23. The end of the screw extends through the forward end of the housing and has a milled head 24.

The housing is cut away rearwardly of the shoe and the shoe is adjustable forwardly and rearwardly. By turning the screw the shoe is moved in either direction. When the shoe is moved rearwardly the inclined face 19 of the housing rides on the inclined face 18 of the shoe and the housing is elevated at its forward end. When the shoe is moved forwardly the forward end of the housing is lowered. Very minute adjustments of the screw may be made.

Each side wall 10' of the housing has an inwardly directed bearing boss 25 located between the partition 12 and a transverse guard wall 26 in which the screw 22 has a bearing. A cutter shaft 27 is journalled in the bosses 25 and has a pinion 28 fastened thereon. A cutter reel 29 is fastened on the shaft and has transverse cutter blades 30. The reel is revolved by the pinion and operates on the work through the open bottom of the housing.

The pinion is driven by an intermediate gear 31 journaled on one of the side walls which in turn is driven by a pinion 32 fastened on the end of a counter shaft 33. The counter shaft is journaled in a transverse bracket 34 on the front side of the partition 12. On the opposite end of the shaft 33 is fastened an angle gear 35 meshing at right angles with an angle gear 36 fastened on the armature shaft 15. By means of this train of gears the reel is driven by the motor 14 at the proper speed.

A knob 37, similar to that used on an ordinary bench plane, is mounted on the front end of the housing. The operator grasps the handle 11 with one hand and the knob with the other hand. By pushing on the switch 16 the motor is started and the reel caused to revolve. The tool is slid along the work in a manner similar to that used in handling a bench plane. If the tool should be cutting too deep the screw 22 is adjusted to move the shoe 17 rearwardly whereby the forward end of the housing is elevated. Owing to the lengths of the housing a very slight movement of the shoe will effect an appreciable adjustment of the reel. By reason of the minute adjustments of the screw, very close and accurate work may be done.

Various changes in the size and shape of the different parts, as well as modifications and alterations may be made within the scope of the appended claims.

What I claim, is:

1. In a jointer of the class described, the combination with a housing having a base and a transverse opening in advance of the base, of a cutter rotatably mounted in advance of said housing and exposed to the work through said opening, a motor arranged in said housing, driving connections between the motor and said cutter, a guard wall extending transversely of the housing in advance of the cutter, the front end of said housing having an inclined wall provided with a longitudinal slot, a shoe associated with the housing and having an inclined upper face co-acting with the inclined wall of the housing and slidably related thereto, said shoe having an upwardly-extending lug disposed in the longitudinal slot of the inclined wall of the housing, and an adjusting screw sustained at one of its ends by the housing and having its other end mounted in the guard wall, said adjusting screw passing longitudinally through the lug of said shoe for effecting adjustment of the latter relatively to the housing, whereby to vary the depth of cut of the cutter.

2. In a portable electric jointer, a housing having a flat work engaging base and a transverse opening in advance of the base, a cutter exposed to the work through the opening of the housing, a shoe having a flat work engaging base and an inclined face supporting the front end of the housing, the front end of the housing having an inclined face resting on the face of the shoe and provided with a slot, a lug on the face of the shoe extending upwardly into the slot of the housing, and an adjusting screw mounted in the housing and passing longitudinally through the lug.

3. In a portable electric jointer, a housing having a flat work engaging base, a transverse partition in the housing, a transverse guard wall in the housing spaced from the partition, the housing having its bottom open forwardly of the partition, a cutter reel mounted in the housing between the partition and the guard wall, a motor in the housing in rear of the partition, a train of gears between the motor and the reel, a sliding shoe having an inclined upper face, the forward under portion of the housing having an inclined face and a slot, a lug on the shoe extending upwardly into the slot, and an adjusting screw mounted in the housing and passing longitudinally through the lug.

4. A portable electric jointer comprising a casing having a longitudinal chamber provided with a flat horizontal bottom wall adapted to serve as a work-engaging base, an electric motor enclosed in said chamber directly above said bottom wall, a pair of spaced parallel side walls extending in front of said casing, a cutter reel journaled between said side walls transversely in front of said chamber, a driving connection between said motor and said reel, the space between said side walls being open at the bottom in front of said chamber to expose the cutter reel to the work, a wedge-shaped shoe having a flat horizontal work-engaging bottom wall and a forwardly inclined guideway engaging and supporting said side walls in front of said drum, and an adjustable slidable connection between said shoe and said side walls in the direction of said inclined guideway to control the relative height of the bottom walls of the casing and of the shoe.

5. A portable electric jointer comprising a casing having a longitudinal chamber provided with a flat horizontal bottom wall adapted to serve as a work-engaging base, a rotary electric motor enclosed in said chamber directly above said bottom wall, said motor extending longitudinally in said chamber and having its driving shaft extending through the front wall thereof, a pair of spaced parallel side walls forwardly extending from the front wall of said casing, a cutter reel journaled between said side walls transversely in front of said chamber, power transmitting mechanism supported by the front wall of said casing for transmitting the rotary movement of said motor shaft to said reel, the space between said side walls underneath said cutter reel being open to expose said reel to the work, a forwardly inclined transverse wall joining said side walls in front of said drum, a wedge-shaped shoe having a flat horizontal work-engaging bottom wall and an inclined upper wall engaging and supporting said inclined transverse wall, said inclined casing wall and said inclined shoe wall extending substantially through the entire width between said side walls and having a lug and groove connection for slidably holding said shoe for movement in the direction of said inclined walls whereby the relative height of the bottom wall of said shoe may be raised with respect to the bottom wall of said casing to vary the exposure of said cutter reel, and an adjusting screw for adjustably moving said shoe with respect to said casing along said lug and groove connection.

6. A portable electric jointer having a frame comprising a bottom wall consisting of a flat horizontal rear base plate adapted to engage the work and a flat inclined front guide plate integrally extending and upwardly rising from said base plate under an angle thereto, said bottom wall having a transverse opening adjacent to the joint of said two plates, a cutter reel mounted on said frame transversely to said bottom wall above said opening to expose a portion of the reel to the work, an electric motor mounted directly above said base plate to drive said reel, a wedge-shaped shoe having a flat horizontal bottom wall adapted to engage the work and an inclined upper guiding surface engaging said inclined guide plate to support the same, and means for longitudinally adjustably sliding said shoe along said inclined guide plate to vary the height of the bottom wall of said shoe above said base plate for controlling the cutting depth of said reel.

In testimony whereof I affix my signature.

ALEX A. CLARKE.